No. 708,866. Patented Sept. 9, 1902.
M. A. COMSTOCK.
CREAM SEPARATOR.
(Application filed May 23, 1902.)
(No Model.) 2 Sheets—Sheet 1.
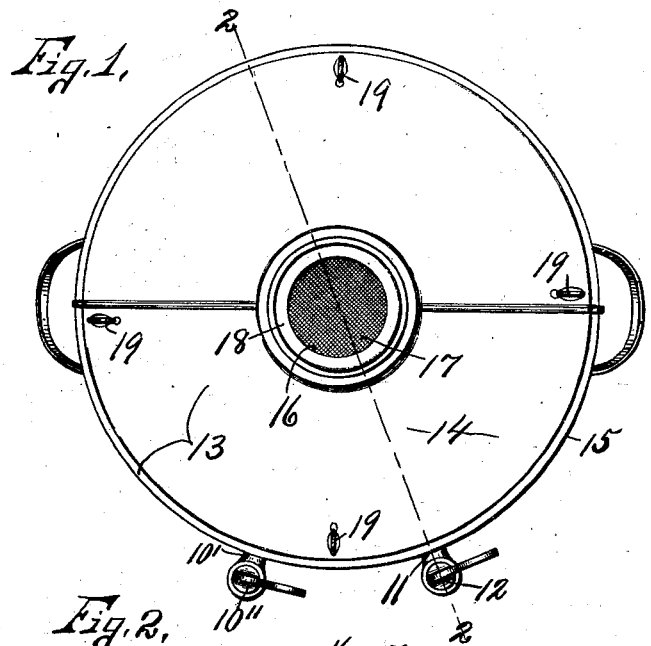
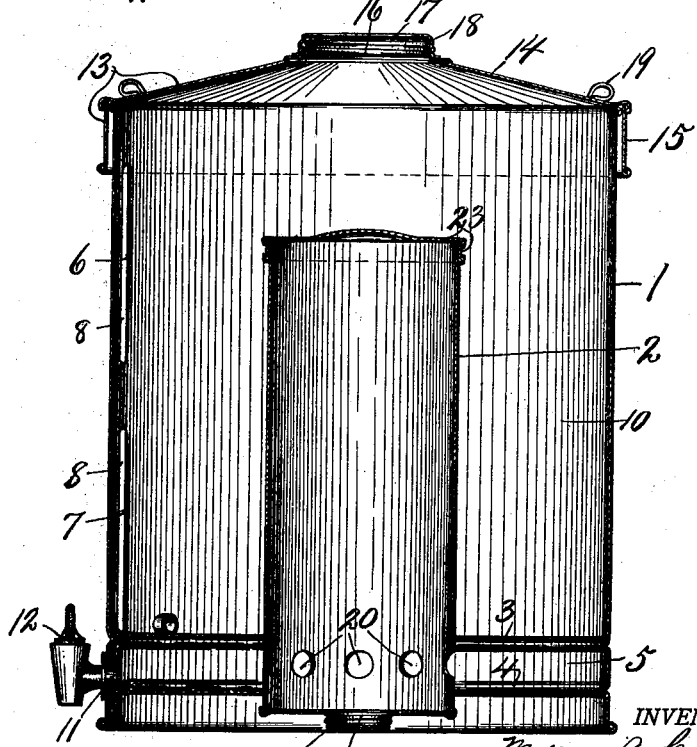
WITNESSES:
F. E. Arthur
K. E. Chase
INVENTOR
Myron A. Comstock
BY
Smith & Denison
ATTORNEYS.

No. 708,866. Patented Sept. 9, 1902.
M. A. COMSTOCK.
CREAM SEPARATOR.
(Application filed May 23, 1902.)
(No Model.) 2 Sheets—Sheet 2.
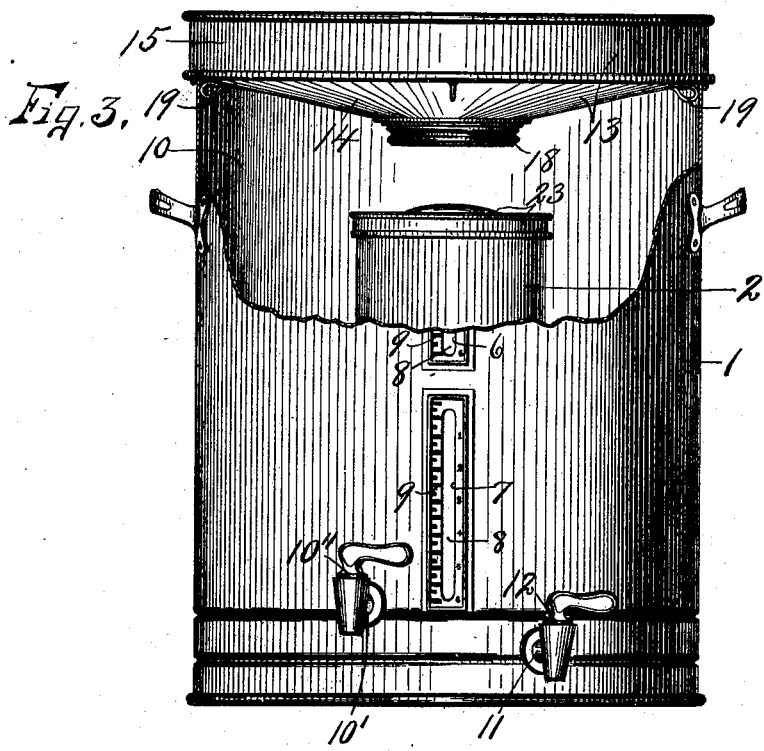
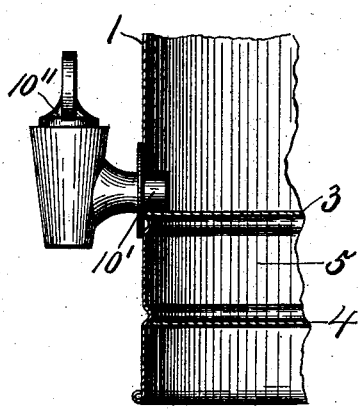
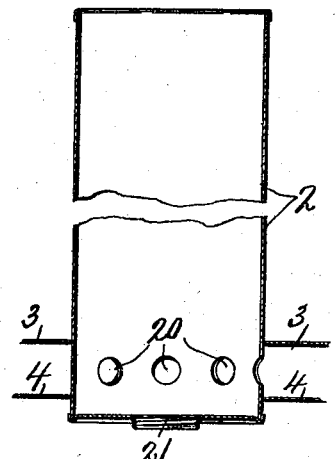
WITNESSES:
INVENTOR
Myron A. Comstock
BY
Smith & Hudson
ATTORNEYS.

UNITED STATES PATENT OFFICE.

MYRON A. COMSTOCK, OF NEWARK, NEW YORK.

CREAM-SEPARATOR.

SPECIFICATION forming part of Letters Patent No. 708,866, dated September 9, 1902.

Application filed May 23, 1902. Serial No. 108,649. (No model.)

*To all whom it may concern:*

Be it known that I, MYRON A. COMSTOCK, of Newark, in the county of Wayne, in the State of New York, have invented new and useful Improvements in Cream-Separators, of which the following, taken in connection with the accompanying drawings, is a full, clear, and exact description.

This invention relates to improvements in cream-separators, being particularly adapted for aerating the milk as the same is discharged into the separator.

One of the objects of my invention is to cause the milk to be first filtered through a fine sieve or screen against a suitable deflector-surface, whereby the body of the milk is broken up or sprayed into fine particles, in which condition it is precipitated through the air into the receptacle in which the cream is separated from the milk, the purpose being to cool the milk as much as possible before being discharged into the separator.

Another object is to further cool the milk in the separator by a suitable cooling liquid confined within chambers at the base and within the body of the milk.

A further object is to provide means for producing a circulation of air through the body of the milk in the separator for the purpose of cooling the same as a substitution for the liquid-cooling agent.

Further objects of my invention will appear in the specification.

Referring to the drawings, Figure 1 is a top plan of my improved separator. Fig. 2 is a sectional view taken on line 2 2, Fig. 1. Fig. 3 is a front elevation, partly broken away, of the device seen in Fig. 1. Fig. 4 is an enlarged vertical sectional view of a portion of the outer receptacle, showing the manner of securing the valved conduits in position. Fig. 5 is a vertical section, partly broken away, of the inner shell, the closures for the upper and lower ends being removed.

Similar reference characters indicate corresponding parts in all the views.

As seen in the drawings, this invention consists, essentially, of outer and inner upright receptacles or shells 1 and 2, which may be formed of any suitable material, such as heavy tin or equivalent metal, and are arranged in fixed relation to each other, the outer shell consisting of an upright cylindrical shell of any convenient size having its upper end open and its lower end or base provided with a hollow bottom wall, consisting of separated substantially horizontal walls 3 and 4 for forming a substantially horizontal subchamber 5. This receptacle 1 is provided with suitable sight-openings 6 and 7, having the usual glass closures 8 and graduations 9, whereby the height or quantity of the milk or cream contained within the receptacle 1 may be readily determined. The upper portion of the shell or receptacle 1 forms the chamber 10 for receiving the milk, said chamber being provided with a discharge-conduit 10' in proximity to the upper face of the partition-wall 3 and provided with a suitable valve 10'', whereby the contents of the chamber 10 may be readily drawn off when desired. The chamber 5 is separated from the chamber 10 and is adapted to receive a suitable cooling liquid, as water, said chamber being provided with an outlet-conduit 11 and a valve 12 for drawing off the cooling liquid when desired. The upper end of the receptacle 1 is provided with a removable invertible closure or hopper 13, having a transverse concavo-convex wall 14 and an annular flange 15, the wall 14 being provided with a substantially central opening 16, across which is a suitable sieve or screen 17, which is held in position by a removable threaded annulus 18, engaged with a threaded nipple surrounding the opening 16. The flange 15 is arranged to telescope with the upper end of the receptacle for holding the closure 13 in one position with the apex uppermost, said closure 13 being also provided with lugs or shoulders 19 for holding the closure 13 in its other position, as seen in Fig. 3, with the apex downward. The inner upright shell or receptacle 2 is also formed of heavy tin or equivalent material and is preferably constructed in the form of an upright cylinder of considerably less cross-sectional area than the shell 1 and extends upwardly from substantially the central portion or portions of the walls 3 and 4, the lower end of said receptacle 2 extending through the chamber 5 and is provided with openings 20, communicating with the chamber 5, and is also extended slightly beneath the lower wall 4 and is formed with a substantially central opening 21 and a removable closure 22. The upper end of the receptacle 2 terminates in a plane beneath the upper end of the receptacle 1 and below the lower end of the hopper 13 when inverted, as seen in Fig. 3, being preferably open, and is provided with a removable closure 23, the central portion of which is concavo-convex, the convex surface being uppermost and serving as a deflector to break up the body of the milk as the same is introduced into the receptacle 1 and causing the same to be precipitated through the air-space between the screen 17 and closure 23 into the base of the receptacle 1 in the form of a fine spray.

In the operation of my invention when it is desired to introduce the milk into the receptacle or separator the closure 13 is placed upon the open end of the receptacle 1 in the position seen in Fig. 3, with the apex at the bottom. The milk is then introduced into the open end of the lid or closure 13 and percolates through the screen 17, discharging upon the convex upper face of the closure 23, and it is thus apparent that this manner of introducing the milk into the separator serves to aerate or cool the same and that milk is maintained at a low temperature by a suitable cooling liquid which is introduced into the receptacle 2 either before or after the milk is discharged into the receptacle 1.

It is apparent from the foregoing description and the accompanying drawings that the heat of the milk surrounding the receptacle 2 and resting upon the wall 3 is absorbed by the cooling liquid in the chambers 2 and 5 and that when said cooling liquid becomes warm or ineffective it may readily be drawn off through the valve 12 and a fresh cooling liquid supplied to the chambers 2 and 5 by simply removing the closures 13 and 23 from the position seen in Fig. 2, or the cap or closure 23 may be removed and the closure 13 inverted to the position seen in Fig. 3 and the water supplied through the screen 17.

It is sometimes desirable to cool the milk within the chamber 1 by circulation of air instead of by a cooling liquid, and in such a case I remove the closures 22 and 23 after having drawn off the liquid from the chamber 5 and support the receptacle 1 upon a suitable frame in such manner that the air is free to circulate through the receptacle 2 and opening in the opposite ends of said receptacle and through the opening 16 and screen 17, it being understood that this air is also free to circulate in the chamber 5 through the openings 20. After the cream has sufficiently separated from the milk within the receptacle 1 the cream may be removed from the surface and the residue may be readily drawn off through the conduit 9 by means of the valve 10".

The operation of my invention will now be readily understood upon reference to the foregoing description and the accompanying drawings, and it will be noted that some change may be made in the detail construction and arrangement of the parts without departing from the spirit thereof. Therefore I do not limit myself to the precise construction and arrangement shown and described.

Having thus described my invention, what I claim, and desire to secure by Letters Patent, is—

1. A cream-separator having a subchamber and an inner upright chamber extending through the upper and lower walls of the subchamber and provided with lateral passages connecting said chambers.

2. A cream-separator comprising a receptacle having separate chambers one over the other, the upper chamber receiving the milk and the lower chamber receiving a cooling liquid, an upright tube extending centrally through the upper and lower walls of the lower chamber and separate devices for drawing off the milk and cooling liquid.

3. In a cream-separator, an outer shell having a milk-receiving chamber and a hollow bottom wall for receiving a cooling liquid, a hopper at the upper end of the receptacle provided with a screen and a central tube within the receptacle alined with the hopper and having its lower end extended through the hollow bottom for the purpose set forth.

4. In a cream-separator, outer and inner upright receptacles, one for the milk and the other for a cooling liquid, the outer receptacle having a hollow bottom and the inner receptacle extending through and communicating with said hollow bottom.

5. A cream-separator comprising outer and inner upright receptacles, the outer receptacle having a subchamber surrounding and communicating with the base of the inner receptacle, an invertible hopper forming the top wall of the outer receptacle and disposed in a plane above the upper end of the inner receptacle, a screen in the apex of the hopper, and a deflector on the upper end of the inner receptacle beneath the screen when the hopper is in either position.

6. A cream-separator comprising outer and inner upright receptacles, the outer receptacle having a subchamber surrounding and communicating with the base of the inner receptacle, an invertible hopper forming the top wall of the outer receptacle and disposed in a plane above the upper end of the inner receptacle, a screen in the apex of the hopper, the inner receptacle being open at both ends above and beneath the subchamber, and closures for the openings, the upper closure having a convex upper face beneath the screen when the hopper is inverted.

7. A cream-separator comprising outer and inner upright shells and a hollow bottom surrounding the base of the inner shell, the inner shell being open at both ends and having lateral openings in its base communicating with the hollow bottom, closures for said open ends, the upper closure having a convex face, a hopper in the upper end of the receptacle provided with a screened opening above the upper closure, and valved conduits leading from the interior of the hollow bottom and from a point above said hollow bottom for the purpose described.

In witness whereof I have hereunto set my hand this 19th day of May, 1902.

MYRON A. COMSTOCK.

Witnesses:
STEPHEN E. COMSTOCK,
GEO. W. MUTH.